March 6, 1928.  1,661,257
E. KIRCH
BICYCLE CARRIAGE
Filed Jan. 12, 1927
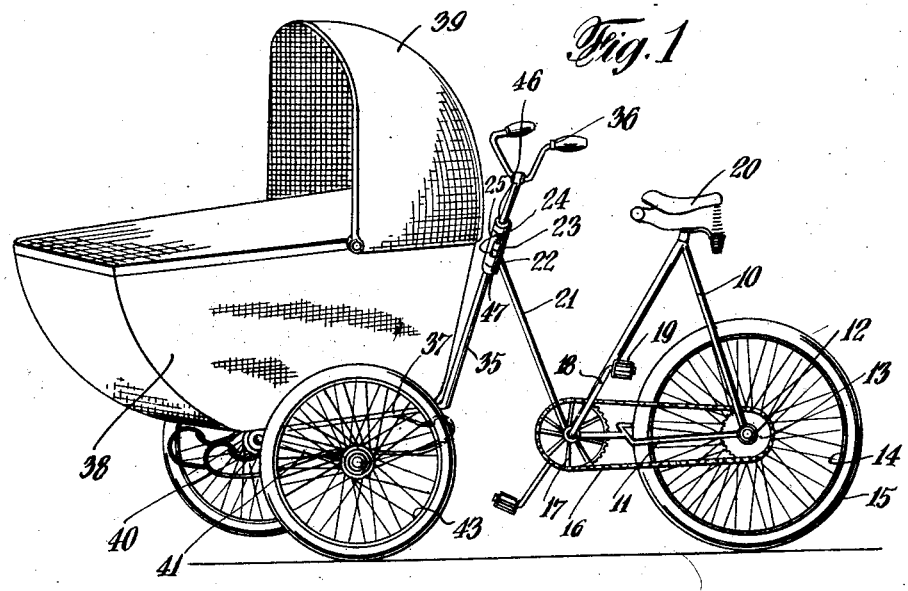
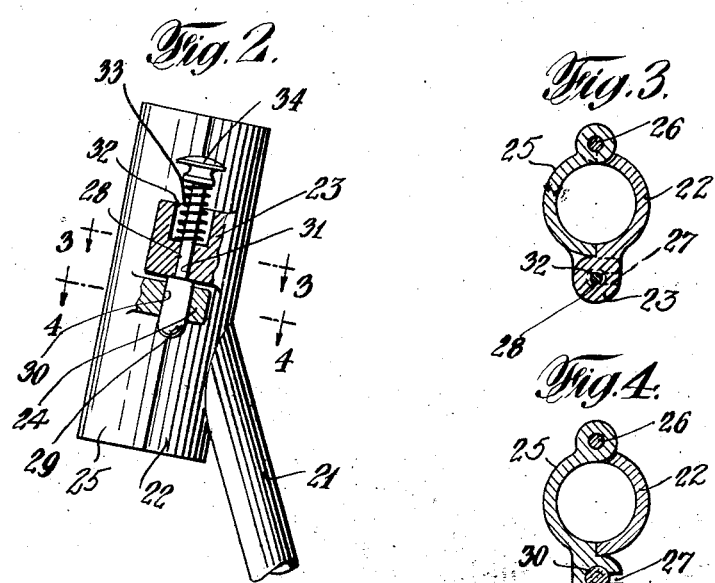
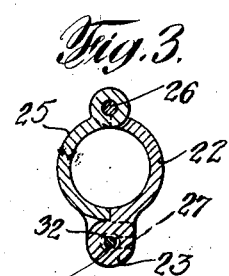
Inventor
Emma Kirch
By her Attorney Patented Mar. 6, 1928.

1,661,257

UNITED STATES PATENT OFFICE.

EMMA KIRCH, OF WILKES-BARRE, PENNSYLVANIA.

BICYCLE CARRIAGE.

Application filed January 12, 1927. Serial No. 160,561.

This invention relates to vehicles with particular reference to such conveyances commonly called baby carriages.

One of the objects of this invention is to provide a combination vehicle embodying a mode of transportation for infants and a bicycle.

A further feature is in the provision of means whereby the carriage portion is readily removed so as to allow substitution of conventional bicycle parts.

These and other objects, are accomplished by the novel construction, combination and arrangement of parts, hereinafter described and illustrated in the accompanying drawing, in which:—

Figure 1 is a general perspective view of an embodiment of this invention.

Figure 2 is an enlarged, fragmentary, partial sectional, partial side elevational view of the carriage removing means.

Figure 3 is a transverse sectional view taken on line 3—3 of Figure 2.

Figure 4 is a like view taken on line 4—4 of Figure 2.

In the drawing, the numeral 10 generally designates an inverted V-shaped frame connected at its outer ends by a forked support 11 carrying at its outer ends a shaft 12 on which is mounted a sprocket wheel 13 and a conventional bicycle wheel 14 provided with a tire 15.

The sprocket 13 is connected by a chain 16 to a larger sprocket wheel 17 fixed on a shaft having oppositely disposed arms 18 carrying pedals 19, the foregoing constituting the drive of the vehicle.

The apex of the frame 10 has fixed thereon, a resilient seat 20.

Connected to the frame 10 at the outer end of its forward arm and parallel to its rear arm, is a rod 21 having formed thereon, a semi-cylindrical section 22 provided with a lug 23 an oppositely disposed lug 24 being formed on a similar section 25, the section being pivoted on a rod 26 to present a sleeve.

The lug 24 is provided with a slot 27 to allow entrance of a plunger rod 28 having an enlarged head 29 normally engaged in a bore 30 in the lug 24, the rod being normally encased in a bore 31 in the lug 24, leading to a counter bore 32 accommodating a coiled spring 33 abutting a plunger button 34.

Passing through the sleeve section is a rod 35 having at its upper end, transverse handle bars 36, the lower end of the rod being bent forwardly as at 37 to support a conventional baby carriage 38 having a pivoted cover 39, the carriage being mounted on shock absorbing springs 40 fixed on an axle 41 provided with wheels 43.

The rod 35 is provided with collars 46 and 47 respectively above and below the sleeve sections 22 and 25.

Thus, by rotation of the pedals 19, the drive wheel 14 is rotated to give the vehicle forward motion.

By turning the handle bar 36, the direction of the vehicle may be guided.

If it is desired to remove the carriage 38, to substitute a conventional forward bicycle apparatus, the button 34 is depressed, thereby disengaging the head 29 from the lug 24 and allowing the sections 22 and 25 to be pivoted on the rod 26 facilitating the removal of the rod 35 and hence the carriage 38.

The foregoing is merely descriptive and is not to be interpreted in a limiting sense as changes may be made without departing from the scope of the appended claim.

Having thus described my invention, what I claim as new and desire to secure by Letters Patent, is:—

In combination with a bicycle, of a carriage, a rod extending upwardly from the rear of said carriage, a pair of pivoted sleeve sections on said bicycle, said sections engaging said rod, a slotted lug on one of said sections, another lug on the other section, a headed plunger rod engaging said lugs and resilient means on said plunger for to normally prevent disengagement of said lugs.

In witness whereof I have affixed my signature.

Mrs. EMMA KIRCH.